United States Patent
Bridgewater, Jr. et al.

[11] Patent Number: 6,124,727
[45] Date of Patent: Sep. 26, 2000

[54] BIAS COMPENSATOR FOR DIFFERENTIAL TRANSMISSION LINE WITH VOLTAGE BIAS

[75] Inventors: Walter Francis Bridgewater, Jr., San Jose; William C. Gintz, Palo Alto, both of Calif.

[73] Assignee: Adaptec, Inc., Milpitas, Calif.

[21] Appl. No.: 09/113,729

[22] Filed: Jul. 10, 1998

Related U.S. Application Data

[60] Provisional application No. 60/052,226, Jul. 11, 1997.

[51] Int. Cl.[7] .................................................. H03K 17/16
[52] U.S. Cl. .............................. 326/33; 326/30; 326/86
[58] Field of Search ........................... 326/33, 30, 56–58, 326/83, 86, 29, 87; 327/307, 362

[56] References Cited

U.S. PATENT DOCUMENTS

| | | | |
|---|---|---|---|
| 4,567,384 | 1/1986 | Stuhlmiller | 326/33 |
| 5,325,355 | 6/1994 | Oprescu et al. | 370/24 |
| 5,374,861 | 12/1994 | Kubista | 326/30 |
| 5,592,510 | 1/1997 | Van Brunt et al. | 375/220 |
| 5,635,853 | 6/1997 | Kikinis | 326/86 |
| 5,694,060 | 12/1997 | Brunt et al. | 326/86 |
| 5,767,699 | 6/1998 | Bosnyak et al. | 326/86 |
| 5,880,599 | 3/1999 | Bruno | 326/56 |
| 5,977,796 | 11/1999 | Gabara | 326/86 |

OTHER PUBLICATIONS

National Semiconductor, "*LVDS Owner's Manual & Design Guide*" (*1st Ed.*), Spring 1997.

*Primary Examiner*—Michael Tokar
*Assistant Examiner*—Don Phu Le
*Attorney, Agent, or Firm*—Martine Penilla & Kim, LLP

[57] ABSTRACT

A bias compensator circuit for significantly reducing an offset produced by a termination bias that is associated with a differential pair bus. The differential pair bus is connected to a driver. The bias compensator circuit includes: (a) a signal source connected to a first line of the differential pair; (b) a first switch for switching ON the signal source while the driver is driving; (c) a signal sink connected to a second line of the differential pair; and (d) a second switch for switching ON the signal sink while the driver is driving.

27 Claims, 7 Drawing Sheets

BIAS COMPENSATOR FOR DIFFERENTIAL TRANSMISSION LINE WITH VOLTAGE BIAS

CROSS REFERENCE TO RELATED APPLICATIONS

This application claims the benefit of U.S. Provisional Patent Application having Ser. No. 60/052,226, filed on Jul. 11, 1997, entitled "Bias Compensator for Differential Transmission Line With Voltage Bias." This application is hereby incorporated by reference.

FIELD OF THE INVENTION

The present invention relates generally to a communication bus within a computer system. More specifically, the present invention relates to a bias compensator for use with a differential transmission line having a termination voltage bias.

BACKGROUND OF THE INVENTION

For data transmission it is important to have bus drivers and bus receivers that allow devices to communicate quickly, efficiently and accurately. This data transmission may occur within a computer system, between computer systems, over a local or wide area network, or over other long distance networks.

One common technique for implementation of data transmission within a computer bus uses differential signaling technology to communicate between devices in a computer system. For communication of one signal, differential signaling may use two differential printed circuit board traces, two lines within a balanced cable, or two electrical routes within a semiconductor device. A variety of differential signaling standards exist, such as Low Voltage Differential Signaling (LVDS), High Voltage Differential Signaling (HVDS) and others. Of course, such differential signaling may also be used for other long-distance data transmission.

Typically, a differential driver includes a current source that drives one of the differential pair lines. The differential receiver has a high DC impedance, so that the majority of driver current flows across a termination resistor generating a voltage drop across the receiver input. When the driver switches, it changes the direction of current flow across the resistor, thereby creating a valid "one" or "zero" logic state.

To help ensure reliability, differential receivers may have a fail-safe feature that guarantees the output to be in a known logic state under certain fault positions. These fault conditions include open, shorted, or terminated receiver input. If the driver looses power, is disabled or is removed from the line while the receiver stays on with inputs terminated, the receiver output remains in a known state with the fail-safe feature. Without the fail-safe feature, if a fault condition occurred external noise above the receiver threshold could trigger the output and cause an error. A receiver without the fail-safe feature could even go into oscillation under certain fault conditions. The fail-safe feature ensures that the receiver output will be a HIGH—rather than in an unknown state —under various fault conditions. The fail-safe feature may be implemented with internal resistors that provide a DC offset of approximately 10 to 30 mV in the receiver circuit.

However, this internal fail-safe circuitry is designed to source/sink a small amount of current providing fail-safe protection for floating receiver input, shorted receiver input, and terminated receiver input, and is not designed to provide fail-safe in noisy environments when the driver is in a tri-state condition. If the cable picks up more differential noise than the internal fail-safe circuitry can overcome, the receiver may switch or oscillate. If this tri-state condition occurs, it is often recommended to add external fail-safe resistors to create a larger noise margin.

These external fail-safe resistors produce a voltage bias (a DC offset) and are useful in achieving a known state for a bus line when that bus line is not being driven, such as being in the tri-state condition described above. For example, data bus structures used in multi-point applications must ensure that when the bus is not driven (such as during no activity or during control activity) that receivers on the bus receive a negated state. This negated state is typically achieved by biasing the bus with a DC offset that assures that the receiver will indicate a non-asserted condition when that bus line is not being driven.

For example, a Small Computer System Interface (SCSI) bus uses a voltage bias in the termination at each end of the SCSI bus. The termination voltage bias is used during the arbitration phase of SCSI protocol in order to help determine which devices are asserting which bits on the bus. The voltage bias assures that any non-driven data lines are put into a negated state. When one peripheral asserts a data line, all of the other data lines will be in a negated state and it may then be determined which peripheral wishes to use the bus. Without a termination voltage bias, it would be difficult to determine which device is asserting a data bit because bits not being asserted would be floating. Other differential technologies may add a voltage bias at other locations on the bus, such as in conjunction with a driver or a receiver, or at a separate location.

However, adding a voltage bias (such as external fail-safe resistors) that creates a DC offset on a differential bus line tends to unbalance the symmetrical differential output drive current and also degrades signal quality. One problem is that this DC offset represents a DC noise source that can distort high speed data signals resulting in errors by the receiver. These errors are especially pronounced when the bus is operated at high speed due to the attenuation of the received AC data signal caused by long cables and high frequency operation.

Thus, while a bias voltage may be desirable to enter a known signaling state when a driver is not driving, it is undesirable when the bus is used for high speed data transfer. Another difficulty with the voltage bias is that it is invariant with signaling frequency and cable lengths, whereas these same factors adversely effect signals. Many existing designs use simple fixed termination voltage sources that are located at the end of the bus. Ultimately, with such a fixed voltage bias, an increase in signal frequency and/or cable length results in the signal becoming attenuated such that is cannot overcome the effect of the fixed voltage bias. In many cases the ends of the bus are not close to an intelligent device which might be able to alter the voltage bias value according to the traffic situation on the bus. Thus, although such termination voltage sources might be switched or altered with some knowledge of data frequency, no means of sending a signal is available. Furthermore, a determination of data frequency and direct manipulation of the voltage bias is rather complex, and in many bus designs there is not an extra signal line available for this type of control. In particular, in an SCSI bus there are no extra signal lines available for sending information to a termination bias voltage located at the end of a cable.

In previous single-ended and differential bus designs, the driver current or voltage swing is relatively large compared to the voltage bias, thus allowing significant cable length at the maximum operating frequency. This large swing (associated with high voltage differential designs) allows a bus to run at higher speeds and with longer cables than were originally specified. More recently though, low voltage differential signaling is seen as having advantages over high voltage differential signaling. Because of the higher power required with a high-voltage driver, power dissipation is an issue and two or three integrated circuits may be needed to implement a bus interface. In other words, not all of the bus signals can be implemented on one chip because of power concerns, so more chips are needed to help dissipate the power. Unfortunately, the use of more than one chip to implement a bus interface leads to mismatch and timing skew between the chips. On the other hand, the use of low voltage differential drivers saves power and allows all drivers and/or receivers for a bus to be integrated on one chip. Having all drivers or receivers on one chip avoids mismatch and skew problems and is simpler to integrate into a greater circuit.

A detailed description of a low voltage differential technology and its advantages and applications may be found in the "LVDS Owner's Manual and Design Guide" available from National Semiconductor Corporation of Sunnyvale, California, Literature No. 550062-001, 1997, which is hereby incorporated by reference. Such a low voltage differential signaling technology and other types is referred to as LVDS. LVDS uses a low voltage swing (about 350mV) to transmit information over a differential pair. The low voltage swing and current mode driver outputs of LVDS create low noise and provide a very low power consumption across frequency.

However, the use of a low voltage differential bus encounters problems with a voltage bias (such as external fail-safe resistors, whether in a terminator or other location on the bus). With a low voltage differential bus, the driver swing is chosen to be smaller (than previous single-ended or high voltage differential designs) so as to reduce attendant electromagnetic interference and driver chip power consumption. Although asymmetrical drivers are specified to compensate for the voltage bias, the values chosen for these asymmetrical drivers unnecessarily limit both the cable length and the signal margin at the receiver to unattractive values. At present, no conventional alternative is available to allow greater speed for longer cable lengths if the same fixed voltage bias is employed.

One method of using an asymmetrical output driver to compensate for the DC offset produced by the bias voltage is described in the draft document X3Y10 SCSI SPI-2 available from the ANSI X3T10 standards committee. An asymmetrical driver drives more current in the direction opposite to the voltage bias with the intent that the extra current in this direction cancel out the voltage bias. Since more current is driven in one state (iLe., asserted or negated) the driver is termed an asymmetrical driver. Unfortunately, the use of asymmetrical drivers on a differential signaling line (such as in LVDS) present numerous problems.

A first problem is that an asymmetrical driver generates greater power supply noise. This noise is cause by switching between the two different currents used to drive the two states on a differential line. When switching between the two different currents, the change in current over time (dI/dT) on the power supply lines along with any inherent inductance will generate greater noise.

A second problem is that unequal output currents creates greater radio frequency interference and electromagnetic interference.

A third problem resulting from an asymmetrical driver is the so-called "wedge" effect that causes phase distortion and eventual failure of differential signals to cross. The problem is due to the driver turning on in an AC mode and trying to cancel the voltage bias that is a constant DC value. Canceling a DC value with an AC source does not work well because the corrective effect with AC varies with frequency. As the frequency increases the correction of the asymmetrical drive is diminished due to loss in the cable, but the DC bias is not. This results in timing distortion of the recovered signal. In SCSI using LVDS technology, timing is critical and this phase distortion presents problems. Furthermore, at higher frequencies the two differential signals become forced apart, almost as if a wedge were being driven between the two of them. This "wedge" is a surprise to system designers and as it becomes more pronounced at higher frequencies, the two differential signals become farther and farther apart as they become attenuated and a receiver will eventually be unable to detect a signal change.

As an example of the "wedge" effect, consider a differential pair having an offset of 100mV and a zero-to-peak voltage of 100mV seen at each of the two receiver inputs. (Such a zero-to-peak voltage of 100mV may result at a receiver if a cable with a 6 dB loss is driven with a 400mV peak-to-peak signal). Assuming that a square wave (having a 50/50 duty cycle) is initially driven into the cable at a high enough frequency (such as 40 MHz), the resulting wave at the receiver resembles a sine wave more than a square wave. When a receiver receives such a sine wave while trying to detect a square wave signal the signal becomes distorted by 16% (42.5/57.5 duty cycle). Furthermore, should the offset between the two lines go to 125mV, then the duty cycle may become distorted by as much as 40%. Such a phase distortion causes timing problems with LVDS technology in particular, and is unacceptable for a SCSI bus at high frequencies and longer cable lengths.

A fourth problem is that an asymmetrical driver can never be perfect and will always have a difference between the assertion and negation levels. In a multi-drop bus system, the impedance of a signal line may change as more receivers and/or devices are added to the line. This impedance change effects the asymmetrical drive levels such that they no longer compensate exactly for the voltage bias value. Thus, the voltage bias value changes or the transmission line impedance changes, resulting in a lessening of the noise margin. For example, assuming a differential pair having a 100mV offset between the two lines, a termination resistance of 100 ohms, and a loaded cable having a loaded impedance of 70 ohms, because of the difference due to the impedance, there may be a difference in the actual asserted and negated voltage values by as much as 15%. Due to this variation of the termination voltage bias and the impedance of the transmission line, there will always be an asymmetrical waveform unless the design values for the difference current exactly match the real loaded cable and the bias being used. As such an exact match is difficult to achieve, such an asymmetrical driver can never guarantee resulting assertion and negation voltage levels that are the same. Furthermore, higher loading that further reduces the cable impedance can cause even more degradation of the signal. These losses occur before any cable transmission losses are taken into account, and before any losses associated with a receiver are taken into account.

A fifth problem with an asymmetrical driver is that circuitry to supply the extra current in one direction can cause the output capacitance to be different for driving one logic state or the other. Such circuitry typically includes a boost transistor connected through a boost resistor to a power source that is used to source the extra current needed to the positive output of the driver, and a corresponding boost transistor connected through a boost resistor to ground used to sink extra current from the minus output of the driver. Each of these boost transistors only turns on to drive a logic "one", and not when driving a logic "zero". Thus, the output capacitance on the node between the boost transistor and the boost resistor is only applied to an output when driving a particular logic state. Such a difference in the output capacitance for different logic states being driven causes excess noise because of the modulation of the output capacitance.

A sixth problem associated with an asymmetrical driver is that for current mode outputs, extra care or extra power consumption is needed to avoid switching noise being coupled into the bias circuitry. For example, when the differential transistors in an asymmetrical driver switch on and off (creating an approximate 1 volt swing) parasitic capacitors associated with these differential transistors and the current mirror transistors couple this switching noise on to the N-channel and P-channel bias nodes. This extra charge on the bias nodes changes the current through the current mirror transistors, thus generating noise in the output. Thus, with an asymmetrical driver having current mode outputs, the extra switching generates noise in the output.

A seventh problem with an asymmetrical driver is that as more output current is needed to drive in one direction, a different output impedance is created for driving a logic level "one" as opposed to a logic level "zero". Thus, the transmission line becomes modulated due to the different impedance. With a longer bus, and greater attenuation of signal strength, the noise generated by this modulation is a problem and may result in a receiver not being able to differentiate a signal from the noise.

An eighth problem with an asymmetrical driver is the asymmetric voltage swing received by a receiver. Although a larger peak-to-peak voltage swing may be achieved with an asymmetric driver, any extra voltage is not only wasted, but ends up causing more noise. For example, FIG. 1 shows a graph 10 having a vertical axis 12 representing 100mV per division and a horizontal axis 14 representing time. A plot of signal 16 is representative of a signal received by a receiver on one differential line that has been driven by an asymmetrical driver at a frequency of approximately 82 MHz. As can be seen from the plot, signal 16 reaches a low level of approximately 220mV and a high level of approximately 290mV. Thus, the peak-to-peak swing is approximately 510mV which is more than sufficient for signal differentiation by a receiver on a differential line. However, note that the high level of 290mV is asymmetric with respect to the low level of 220mV. The extra 70mV for the signal high level will cause extra noise on the transmission line because of the higher voltage.

A ninth problem with asymmetrical drivers is that the drivers must match the bias voltage, which itself may be inaccurate. For example, if a voltage source for the voltage bias or any of the termination resistors are out of tolerance, then there may not be exactly the expected differential between a pair of signals. A driver expecting an exact termination bias voltage of 100 mV may experience problems when driving asymmetrically if a particular expected termination bias voltage is out of tolerance.

Thus, it should be apparent that the use of an asymmetrical driver causes numerous problems that are accentuated at long cable lengths and high frequencies, and especially with LVDS.

Therefore, it would be desirable to be able use a symmetrical driver with differential signaling, thus allowing greater cable lengths and/or higher frequencies and/or better signal to noise ratios for high speed data transmission. It would also be desirable for such a technique to co-exist with existing differential signaling that does use a voltage bias so that cables and other technology currently in use can continue to be employed, so that a bus signal line is still able to achieve a known state when a driver is not driving, and so that fail-safe features may continue to be employed.

SUMMARY OF THE INVENTION

To achieve the foregoing, and in accordance with the purpose of the present invention, a voltage bias compensator circuit is disclosed that is able to eliminate or reduce the DC offset produced by a voltage bias. Such a bias compensator circuit may be employed anywhere on the bus and can be controlled to eliminate the voltage bias only during data transfer and not during a tri-state (or other) condition when the voltage bias is needed. By compensating for, and essentially eliminating the voltage bias, a symmetric driver may be used and all of the disadvantages associated with an asymmetrical driver are avoided. Thus, better signal to noise ratios are achieved, and greater cable lengths and/or higher frequencies may be used. Because the bias is compensated for, a symmetrical driver can be used resulting in better driver balance, reduced cable unbalance and reduced power supply current ripple. Furthermore, the present invention is compatible with existing differential signaling standards and may be used with existing differential buses that include a voltage bias and asymmetric drivers. The invention works well in compensating for a termination voltage bias in LVDS.

In one embodiment of the invention, a current source load is switched on while a driver is driving in order to reduce and/or eliminate the DC offset produced by the voltage bias. A current source/sink is used for each line of a differential pair and the value of these current sources are sized so as to remove all of the DC offset. The required current value for each current source is equal to the DC offset divided by one-half of the termination resistance. As a current source inherently has an extremely high impedance, the addition of such a current source to a bus line in order to compensate for the voltage bias will not disturb the impedance characteristics of the bus. A voltage source could also be used to compensate for the voltage bias, but as a voltage source has a lower impedance, it is not as desirable as a current source. Preferably, the current source impedance is at least five or six times greater than the impedance of the loaded bus.

Advantageously, such a bias compensator circuit can be placed anywhere on a bus. The bias compensator need not be placed at the end of a bus along with a termination voltage bias, although it could be so placed. In a preferred embodiment of the invention, the bias compensator is integrated with a symmetrical driver in order to take advantage of a tri-state indicating signal available from the driver. Availability of such a tri-state signal within the driver allows the bias compensator to turn on when the driver is driving, yet turn off and allow the termination voltage bias to take effect when the driver is in a tri-state condition. Another advantage to co-locating the bias compensator within the driver is that the resulting effect is transparent to the receiver. In this embodiment, there is a bias compensator associated with each driver, although it is contemplated that a single bias compensator circuit could be used for all symmetric drivers on a bus that wish to compensate for a voltage bias. In general, the bias compensator may be incorporated as part of any bus device that is able to decode bus phases, and can thus supply the command to switch on the bias compensator without requiring a separate line being added to the bus.

Because the bias compensator is portable and may be attached at any point on the bus, there is no need to design extra circuitry and/or use an extra bus signal line to communicate with a termination voltage bias at a cable in order to reduce it. The bias compensator automatically compensates for a termination voltage bias by being applied at any point on the bus.

The present invention is applicable to all data transmission lines using differential signaling technology that use a voltage bias and to any configuration of a differential bus such as a point-to-point configuration, a bi-directional half-duplex configuration and a multi-drop configuration. The present invention is also especially useful in a low voltage differential technology such as LVDS where lower noise margins exist.

Furthermore, the present invention is able to compensate for a wide variety of types of biasing on a differential line. The present invention compensates for not only a termination bias voltage implemented using a voltage source and resistors, but also for a termination bias implemented using a current source. Also, the bias compensated for need not be restricted to a DC termination bias, but an AC termination bias is also compensated for by the present invention. For example, an AC termination bias using a resistor and capacitor in series is compensated for by the present invention. The present invention is able to compensate for the DC component of the AC termination. Examples of buses that use such AC termination are the IDE, ATA and ATAPI buses.

The present invention is useful where the termination bias voltage is known (or can be calculated) ahead of time, and an embodiment is also useful where the bias is not known accurately or cannot be estimated. In this embodiment, an automatic bias compensator circuit supplies increasing current until the bias is canceled, and then stops the current increase.

Because a symmetrical driver may be used with the present invention, most, if not all of the problems associated with an asymmetrical driver are eliminated. With respect to problem one described above, power supply noise is reduced because the bias compensator current is turned on whenever the output driver is not in a tri-state high impedance mode. Since the driver is not an asymmetrical driver, a constant current is flowing all of the time and no power supply noise is generated. As for the second problem, electromagnetic interference radiation is reduced because the symmetrical output driver has balanced differential outputs in both directions. Also, because the output driver is operating in a symmetrical mode and not asymmetrical, it is easier to achieve more balanced edge rates and skew, factors that typically contribute to electromagnetic interference.

Problem number three, the so-called "wedge" effect, is eliminated because as the output is not asymmetrical, there is constant attenuation for the driver in both directions. No longer is an AC current attempting to cancel a DC offset. Problem four is prevented because the bias compensator current is DC not AC, and impedance changes along the cable are not relevant to a DC current.

For drivers that employ current mode output, problems five and six are also eliminated by use of the present invention. As for problem five, both of the boost transistors will be on when an output is enabled, thus there is never any "extra" capacitance when driving a logic level "one" as opposed to a "zero". As for problem six, because the driver is not asymmetrical, the differential transistors are not switching on and off causing an extra charge on the bias node. With the present invention, the differential transistors that cause this problem will always be on, thus there will be no capacitive coupling onto the bias nodes.

Problem seven is also eliminated because as the driver is symmetrical, there is no extra current needed for driving in one direction as opposed to the other. Thus, there is no impedance difference for driving different logic levels and the line does not become modulated due to any impedance difference. Problem eight is also eliminated because as the driver is now symmetric, the receiver receives a symmetric voltage signal.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Through the use of the present invention, a voltage bias on a differential signaling transmission line of a bus is compensated for by a bias compensator circuit. Because a symmetric output driver may then be used to send a differential signal to a receiver on the bus, the receiver receives a symmetric signal such as illustrated in FIG. 2.

Figure 1:
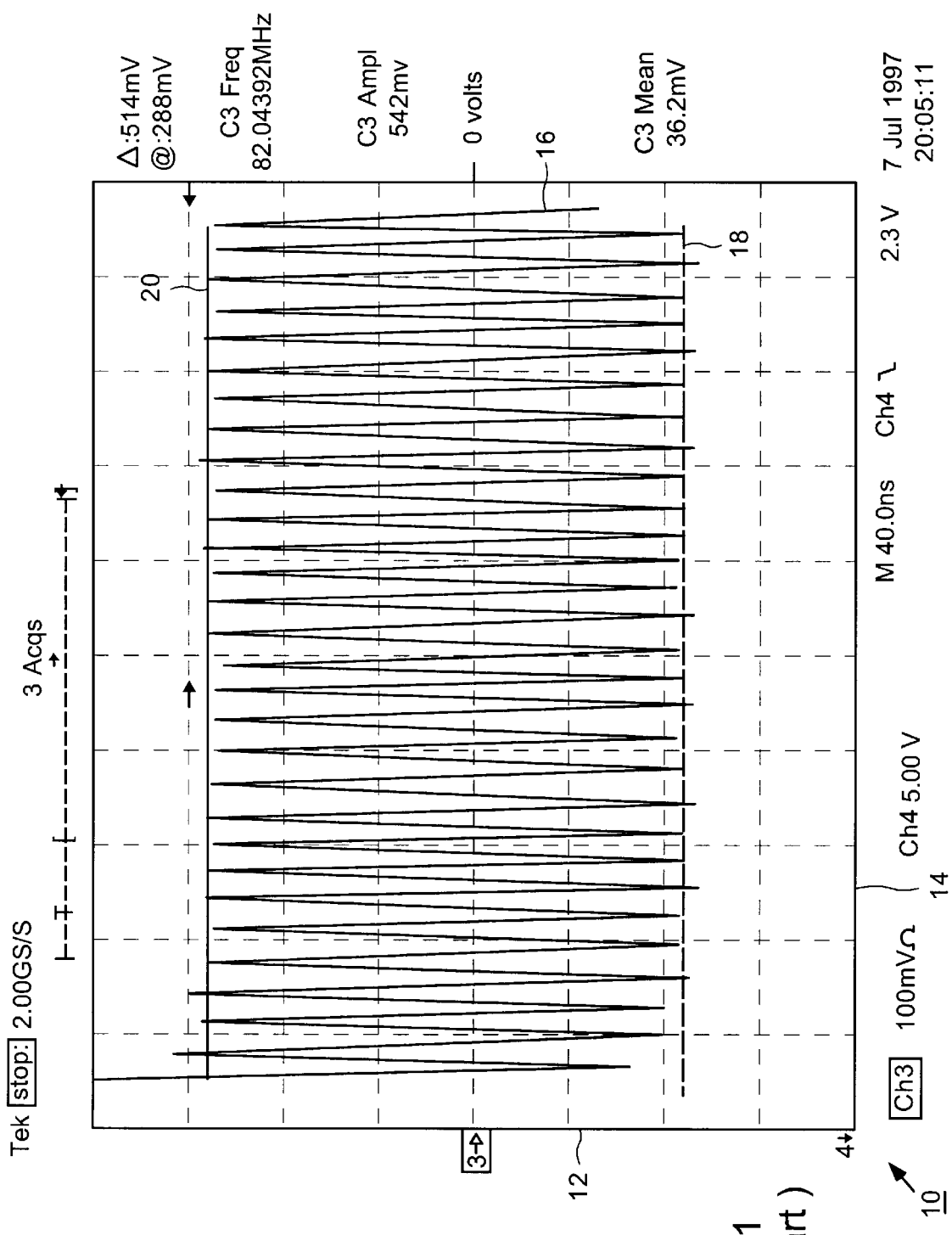
FIG. 1 is a plot of a received signal from an asymmetrical driver.
Figure 2:
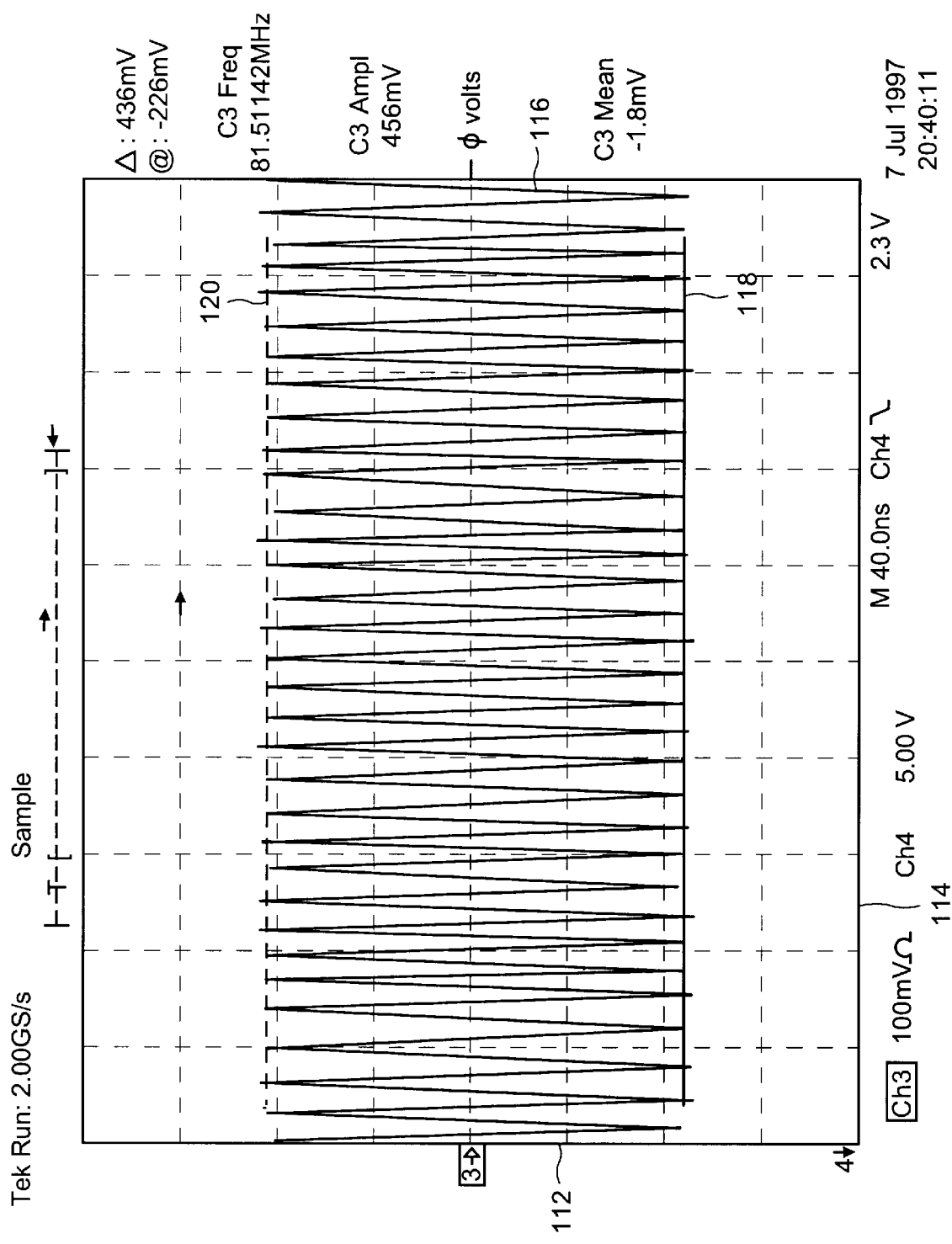
FIG. 2 is a plot of a received signal from a symmetrical driver in accordance with an embodiment of the present invention.

FIG. 2 shows a graph 100 having a vertical axis 112 representing 100mV per division and a horizontal axis 114 representing time. A plot of signal 116 is representative of a signal received by a receiver on one differential line that has been driven by a symmetrical driver at a frequency of approximately 82 MHz. As can be seen from the plot, signal 116 reaches a low level of approximately −220mV and a high level of approximately 210mV. Thus, the peak-to-peak swing is approximately 430mV which is more than sufficient for signal differentiation by a receiver on a differential line. The high level of 210mV is nearly symmetric with respect to the low level of 220mV. There is no large amount of excess asymmetric voltage associated with a high level that would cause extra noise on the transmission line. Thus, unlike FIG. 1 in which the received signal was asymmetric with respect to the zero volt level, signal 116 of FIG. 2 is nearly symmetric.

Figure 3:
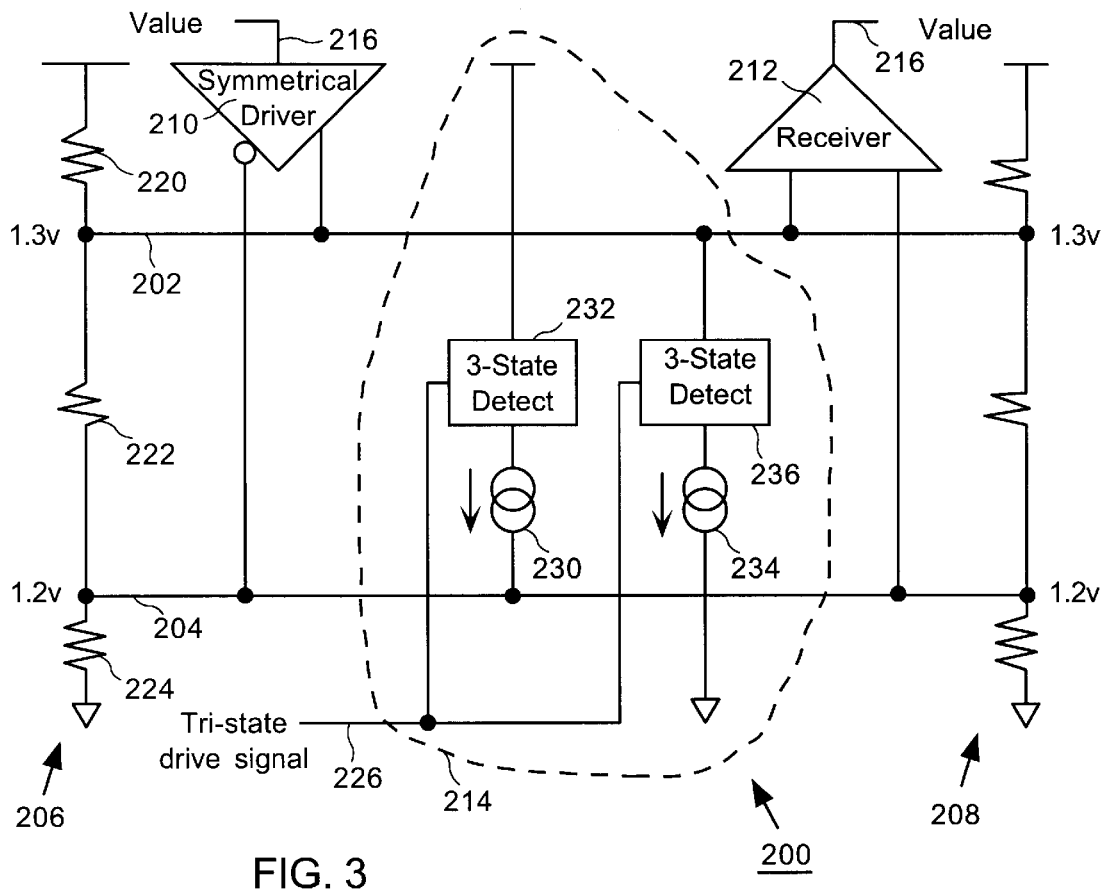
FIG. 3 is a differential bus incorporating an embodiment of the present invention.

FIG. 3 illustrates a differential bus arrangement 200 that incorporates one embodiment of the present invention. Shown are a differential pair of signal lines 202 and 204 having termination bias circuitry 206 and 208 at each end of the bus. A symmetrical differential output driver 210 attaches to the bus and is in communication with a receiver 212. A bias compensator circuit 214 is also connected to the differential signal lines at any point along the bus. In operation, when driver 210 is driving and not in a tri-state condition, driver 210 accepts value 216 and transmits it over signal lines 202 and 204 to be received by receiver 212. Advantageously, bias compensator circuit 214 compensates for the offset voltage produced by terminators 206 and 208 so that driver 210 may transmit values symmetrically.

Terminator 206 includes resistors 220, 222, and 224 which when connected to power and ground as shown are suitable for producing 1.3 volts on signal line 202 and 1.2 volts on signal line 204 when no drivers are driving the bus. Terminator 208 operates in a similar fashion. Thus, the termination bias voltage shown produces a difference of about 100 mV between the two signal lines. Thus, an asymmetrical driver need only drive 400 mV in one direction because of the 100 mV difference already present in order to achieve a 500 mV voltage swing for negating a signal. However, when asserting a signal in the other direction, an asymmetrical driver must drive 600 mV in order to achieve a 500 mV voltage swing in order to overcome the already present 100 mV.

Advantageously, with the present invention, as bias compensator circuit 214 compensates for and eliminates the termination bias voltage, there will be no differential of 100mv between the two signal lines and a symmetrical driver may be used.

When tri-state drive signal 226 is not active (i.e., when a symmetrical driver wishes to drive the bus), then bias compensator circuit 214 will be turned on in order to compensate for the termination voltage bias in order for the symmetrical driver to be used. Bias compensator 214 includes a current source (i.e., signal source) 230, tri-state detection circuitry 232, a current sink (i.e., signal sink) 234 and tri-state detection circuitry (e.g., switch) 236. When circuitry 232 and 236 detect that a driver wishes to drive the bus, current source 230 is connected from power to signal 204 and current sink 234 is connected from signal 202 to ground. In this fashion, bias compensator 214 operates to counteract the offset on signal lines 202 and 204 so that no offset is present. Detection circuitry 232 and 236 may be as simple as connecting tri-state signal 226 to the base of a transistor, or may involve more complex circuitry for performing the function of detecting a tri-state condition and turning on or off the bias compensator circuit.

Without any offset, symmetrical driver 210 may operate effectively at higher speeds and over longer cable lengths. For example, with bias compensator 214 turned on, the voltage on line 202 will be reduced to approximately 1.25 volts, and the voltage on line 204 will be increased to approximately 1.25 volts. Thus, there is no DC offset between the two signal lines. The required current value for each of the current sources 230 and 234 may be calculated by dividing the DC offset voltage by one-half of the total termination resistance of the differential line (i.e., the equivalent of the two termination resistances in parallel). For example, if the total termination resistance is 100 ohms and the DC offset is 100 mV, then the current needed for each current source/sync in order to compensate for the offset is approximately equivalent to 100 mV divided by 50 ohms, which is a value of about 2mA. Thus, a value of 2 mA through each current source/sink would be sufficient to compensate for the termination voltage bias.

Preferably, the impedance of each current source/sink is five or six times the impedance of the loaded bus. In one embodiment of the invention, an impedance of 660 ohms for each current source/sink works well with a loaded bus having an impedance of 100 ohms. Preferably, the current source is relatively constant over the range of signal amplitudes that may be experienced on the bus. A lower current source impedance will drop impedance of the bus, consequently lowering received signal amplitude. Furthermore, the current source impedance need not be purely resistive. For example, a reactive source impedance may be used to compensate for a large capacitive load on the bus. Also, a resistor with an inductive component would also work well.

Figure 4:
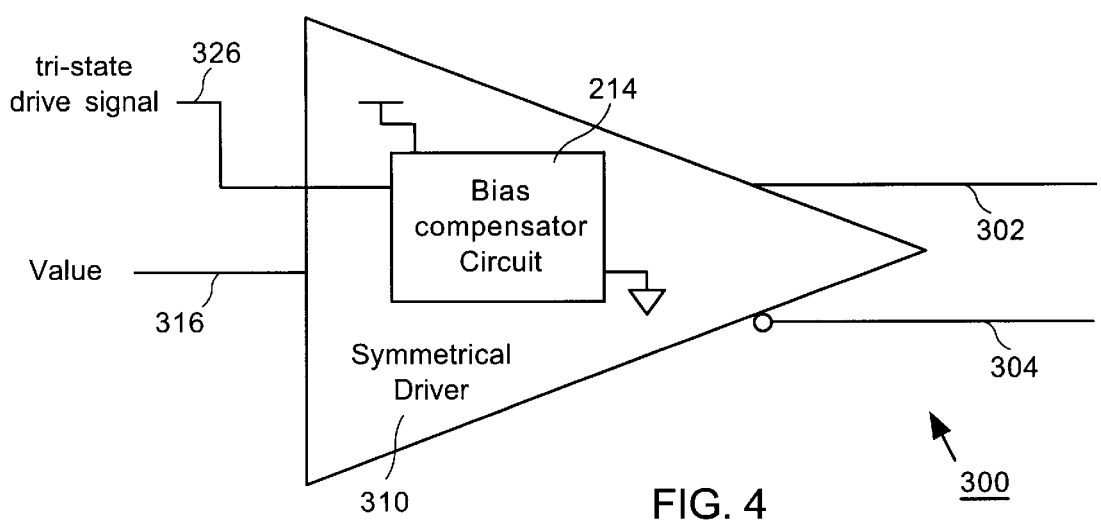
FIG. 4 illustrates a symmetrical driver incorporating a bias compensator circuit according to one embodiment of the present invention.

As described above, bias compensator circuit 214 may be located anywhere along the bus and may even be incorporated into a driver or into a receiver. FIG. 4 illustrates another embodiment of the invention 300 in which a symmetrical driver 310 incorporates bias compensator circuit 214. Driver 310 receives a value 316 for transmission over a differential pair of signals 302 and 304. Bias compensator 214 is integrated into driver 310 and receives tri-state drive signal 326 for determining when to turn on.

Figure 5:
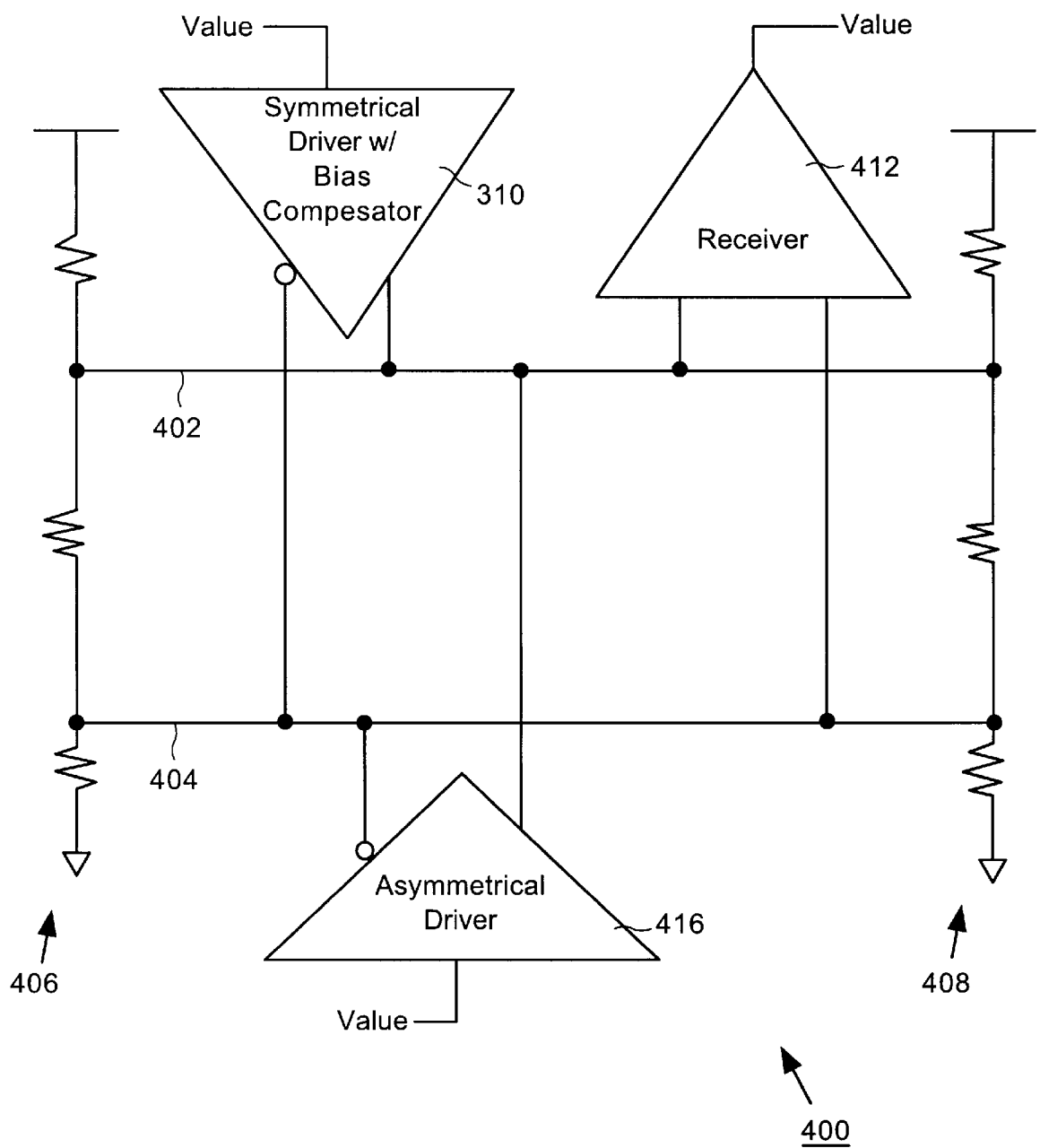
FIG. 5 is a differential bus using a symmetrical driver of the present invention along with a prior art asymmetrical driver.

FIG. 5 illustrates another use of the invention on a differential bus 400. Bus 400 includes a differential pair of signal lines 402 and 404 having bias voltage terminators 406 and 408 at each end of the cable. Connected to this differential pair is the symmetrical driver 310 of FIG. 4 that includes bias compensator circuit 214, a receiver 412 and a conventional asymmetrical driver 416. In this embodiment, symmetrical driver 310 is able to coexist on a bus line where asymmetrical drivers are used. In operation, when driver 310 is not driving, its tri-state signal is active and its bias compensator circuit is turned off allowing terminators 406 and 408 to produce an offset on the bus. Thus, when asymmetrical driver 416 wishes to drive the bus, it may do so in its standard asymmetrical fashion in which it interacts with the termination voltage bias so that receiver 412 receives a signal from the asymmetrical driver.

On the other hand, when asymmetrical driver 416 is not driving and symmetrical driver 310 wishes to drive the bus, its tri-state signal will indicate to the bias compensator circuit that there is no tri-state condition and that the driver wishes to drive. Thus, bias compensator circuit 214 will turn on and will compensate for the termination voltage bias so that symmetrical driver 310may drive in a symmetrical fashion such that receiver 412 receives a signal. Thus, the bias compensator circuit of the present invention is able to be used on a bus where asymmetrical drivers are also used.

Figure 6:
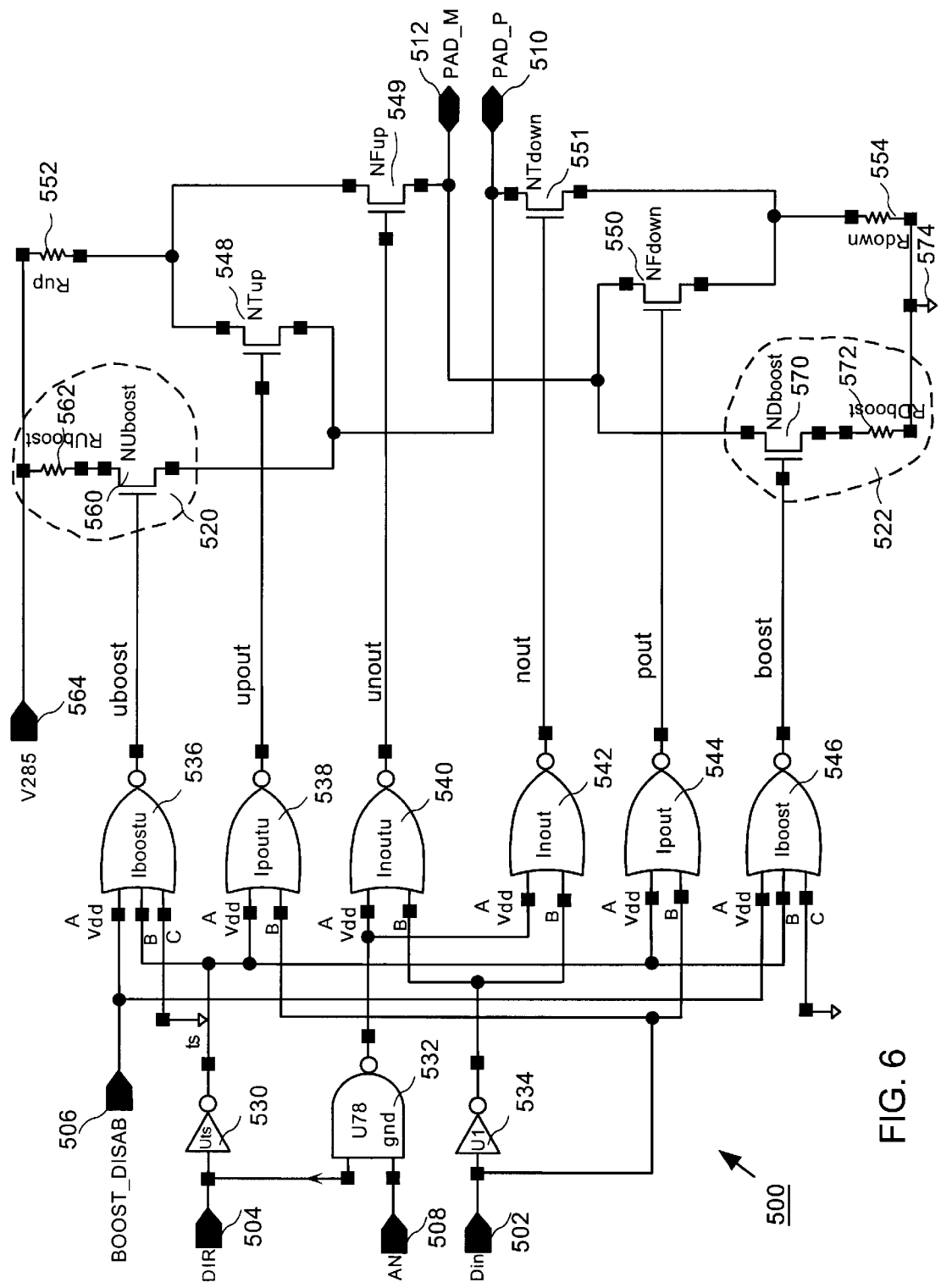
FIG. 6 is a symmetrical driver incorporating a bias compensator circuit according to one embodiment of the present invention.
Figure 7:
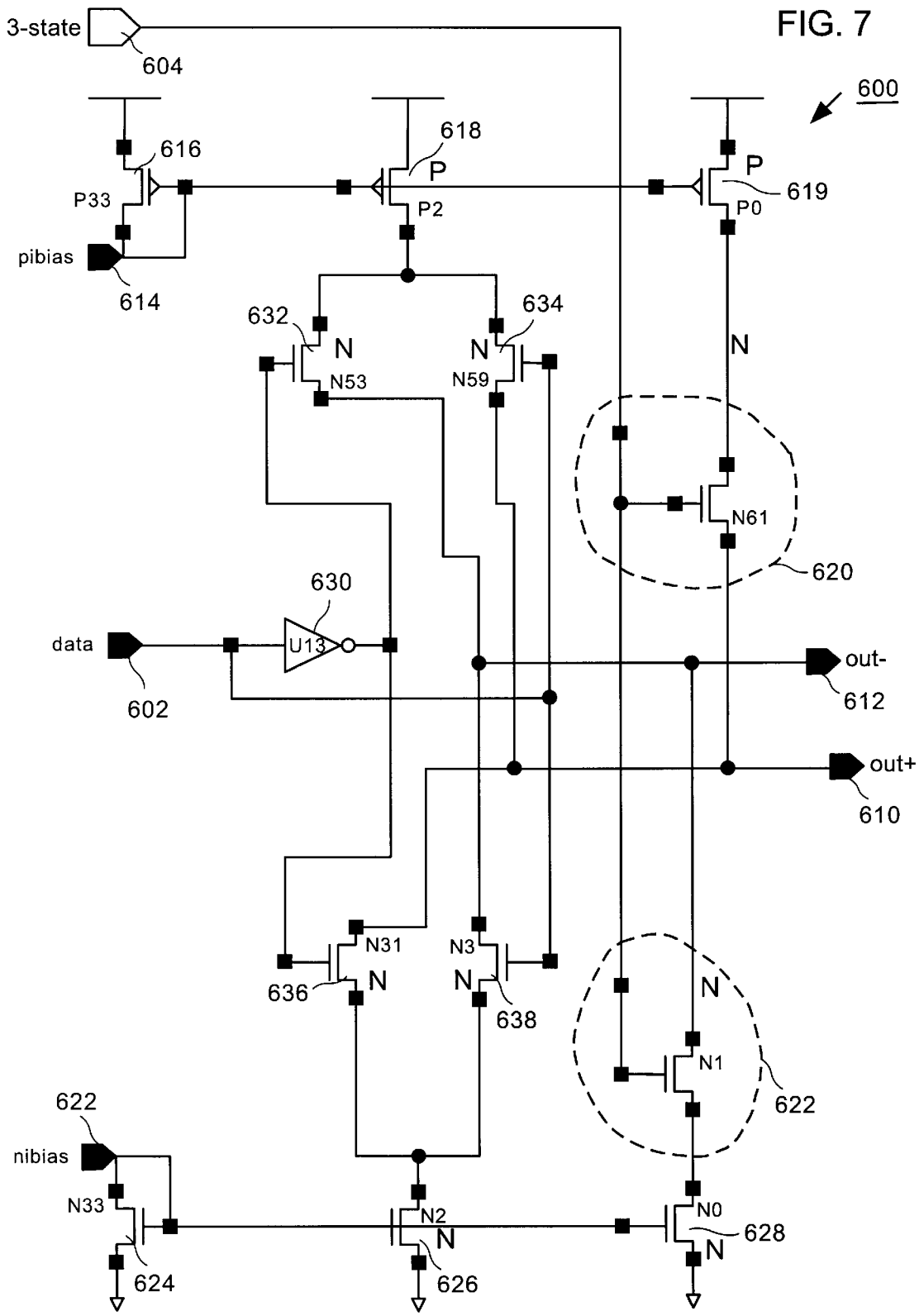
FIG. 7 is a symmetrical driver incorporating a bias compensator circuit according to another embodiment of the present invention.

A symmetrical driver having a bias compensator circuit according to the present invention, may be implemented in a wide variety of manners. By way of example, FIGS. 6 and 7 present two possible implementations. These implementations use 0.06 micron technology in bulk CMOS. FIG. 6 illustrates in detail a symmetrical driver 500 that may be used to implement driver 310 of FIG. 4. Driver 500 accepts a data signal 502, a tri-state signal 504, a bias compensator disable signal 506 and an active negation signal 508. Data 502 is a value accepted by the driver and transmitted to a bus via a positive signal line 510 and a minus signal line 512. Tri-state signal 504 is a logic level "one" when the driver is driving, and is a logic level "zero" when the driver is in a tri-state condition. Bias compensator disable 506 may be used to completely disable the bias compensator circuitry of driver 500 if desired. Active negation 508 is used for operating driver 500 in a wired "OR" mode.

Circuits 520 and 522 form the bias compensator circuit of driver 500. Driver 500 also includes inverter 530, NAND gate 532, inverter 534, and NOR gates 536–546. Resistors 552 and 554 are used to set a drive current for a symmetric data signal. N-channel transistors 548, 549, 550 and 551 form the differential drive for driving the symmetrical data signal.

Bias compensator circuit 520 includes an N-channel transistor 560 and a resistor 562 connected to power 564. Thus, a current source is provided by way of power source 564 and resistor 562. When driver 500 wishes to drive data signal 502, signals 504 and 506 operate to turn on transistor 560 thus providing a current source that provides voltage compensation for signal 510. When driver 500 is in a tri-state condition, transistor 560 is off and no extra current is supplied.

Bias compensator circuit 522 includes an N-channel transistor 570 and a resistor 572 connected to ground 574. Thus, a current sink is provided by way of ground 574 and resistor 572. When driver 500 wishes to drive data signal 502, signals 504 and 506 operate to turn on transistor 570 thus providing a current sink that provides voltage compensation for signal 512. When driver 500 is in a tri-state condition, transistor 570 is off and no extra current is sunk.

FIG. 7 illustrates in detail a symmetrical driver 600 that may be used to implement driver 310 of FIG. 4. Driver 600 accepts a data signal 602 and a tri-state signal 604. Data 602 is a value accepted by the driver and transmitted to a bus via a positive signal line 610 and a minus signal line 612. Tri-state signal 604 is a logic level "one" when the driver is driving, and is a logic level "zero" when the driver is in a tri-state condition.

Driver 600 includes a P-channel bias node 614 for biasing P-channel transistors 616, 618 and 619 which are used to set a current level. N-channel bias node 622 is used to bias N-channel transistors 624, 626 and 628 which are also used to set a current level. Also included is an inverter 630, and N-channel transistors 632–638 which form the differential circuit to drive the symmetric data signals on lines 610 and 612.

In this embodiment of the invention, the bias compensator circuit is implemented by N-channel transistors 620 and 621. When tri-state signal 604 indicates that driver 600 is driving, then transistor 620 will turn on, thus supplying extra current to line 610 to compensate for the voltage bias on that line. Similarly, when tri-state signal 604 indicates driving, transistor 621 also turns on thus providing a current sink for signal 612 in order to compensate for the voltage bias on that line. Thus, it should be appreciated that a bias compensator circuit may be implemented in a variety of ways all having the same desired effect of compensating for a voltage bias on a differential signaling line.

Figure 8:
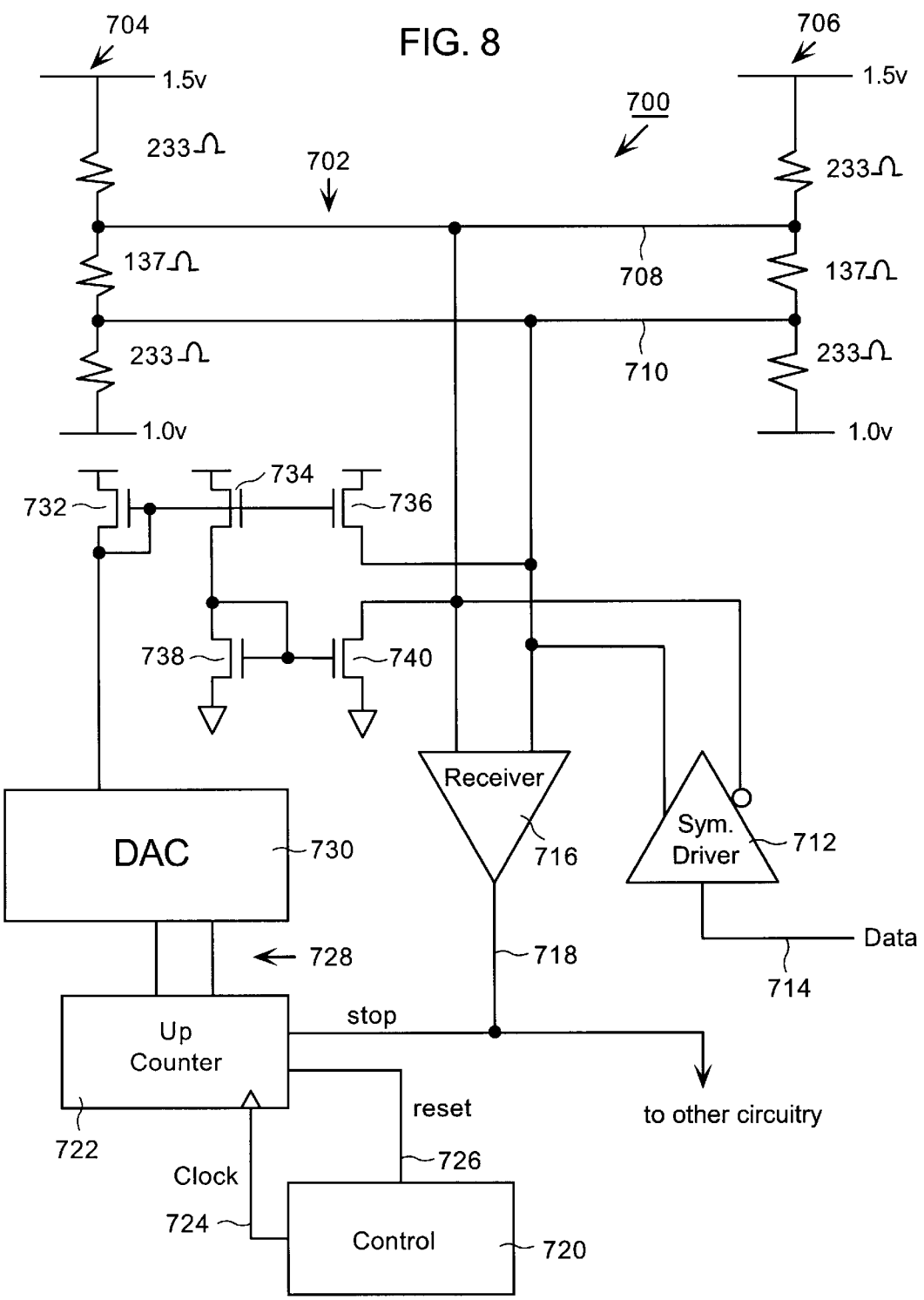
FIG. 8 is a differential bus with a bias compensator circuit for automatically compensating for an offset bias voltage.

FIG. 8 illustrates another embodiment of the invention 700 in which a bias compensator circuit automatically compensates for an offset bias voltage present on a differential bus 702 (for example, an LVDS SCSI bus). Such an automatic bias compensator is useful where the exact offset voltage is not known apriori. The automatic bias compensator gradually compensates for the offset until it has been canceled. Thus, it is not necessary to know beforehand the exact value of the offset voltage on a bus.

Differential bus 702 includes an example termination bias 704 at one end, and another example termination bias 706 at the other end, and signal lines 708 and 710. Connected to the signal lines is a symmetrical driver 712 that receives a data signal 714 for transmission along the bus to a receiver 716. Receiver 716 produces received signal 718 that serves as a stop signal and is also routed to other circuitry for processing.

Included within the automatic bias compensator are control logic 720 that controls Up Counter 722 via clock signal 724 and reset signal 726. Up Counter 722 transmits an increasing count signal 728 to digital-to-analog converter (DAC) 730. Transistors 732–740 use the output from DAC 730 in order to supply current to signal lines 708 and 710 to cancel the bias voltage level.

In operation, when the driver wishes to drive a data value symmetrically, control logic 720 detects a non tri-state condition and directs clock 724 to count up the Up Counter 722. DAC 730 receives this increasing count and increases its current output. When DAC 730 outputs enough current to cancel the bias voltage level, receiver 716 switches from a "zero" to a "one" logic level. This switching of levels for stop signal 718 triggers Up Counter 722 to stop counting. Thus, DAC 730 stops increasing current and the bias voltage is effectively canceled.

Although the foregoing invention has been described in some detail for purposes of clarity of understanding, it will be apparent that certain changes and modifications may be practiced within the scope of the appended claims. For instance, the present invention is applicable to any data transmission using differential signaling technology having a voltage bias. This voltage bias may be in the form of resistors external to a receiver, may take the form of internal fail-safe resistors, may be a termination bias, may be implemented using a current source, or may even be an AC termination bias. Also, such a voltage bias may be a termination voltage bias at the end of a cable that uses a number of resistors, or may be located elsewhere on the bus such as in association with a driver or receiver. Furthermore, the bias compensator circuit may be a discrete unit located anywhere on the bus, or may be integrated with a driver or receiver. Also, a symmetrical driver incorporating the present invention may be used on a bus in conjunction with other asymmetrical drivers. The bias compensator circuit may be implemented using any suitable semiconductor process, discrete analog/digital circuitry, or may even use software to control its operation. Therefore, the described embodiments should be taken as illustrative and not restrictive, and the invention should not be limited to the details given herein.

What is claimed is:

1. A bias compensator circuit for significantly reducing an offset produced by a termination bias that is associated with a differential pair bus connected to a driver, the bias compensator circuit comprising:

a signal source connected to a first line of the differential pair;

a first switch for switching ON the signal source while the driver is driving;

a signal sink connected to a second line of the differential pair; and a second switch for switching ON the signal sink while the driver is driving, such that when the signal source and signal sink are ON, substantially all of the offset is cancelled.

2. A bias compensator circuit as recited in claim 1, wherein the first switch is a first tri-state detector that is configured to receive a tri-state drive signal while the driver is not driving, and the second switch is a second tri-state detector that is also configured to receive the tri-state drive signal when the driver is not driving.

3. A bias compensator circuit as recited in claim 1, wherein the signal source is connected to power and the signal sink is connected to ground when the driver is driving.

4. A bias compensator circuit as recited in claim 3, wherein when the signal source is connected to power and the signal sink is connected to ground, the offset is substantially reduced.

5. The bias compensator as recited in claim 1, wherein the termination bias is a voltage bias that is provided by a termination resistance of the bus, wherein the signal source is a current source, and wherein the signal source has a particular value that is substantially equal to the DC offset divided by one-half of the termination resistance.

6. The bias compensator as recited in claim 5, wherein an impedance of the current source is at least between about 5 times and about 6 times greater than an impedance of the bus when the bus is loaded.

7. The bias compensator as recited in claim 1, wherein the signal source is a voltage source.

8. The bias compensator as recited in claim 2, wherein the bias compensator is configured for placement substantially anywhere on the bus.

9. A differential bus system for facilitating communication between computer devices, the differential bus system comprising:
    a bus including a termination bias that produces an offset;
    a symmetrical driver connected to the bus; and
    a bias compensator that is capable of significantly reducing the offset, wherein the bias compensator is integrated with the symmetrical driver, and the bias compensator is configured to turn on when the symmetrical driver is driving, and to turn off when the symmetrical driver is in a condition that is different than driving;
    wherein the bus is capable of decoding bus phases and of supplying a command to switch on the bias compensator without requiring an additional separate line on the bus.

10. The differential bus system as recited in claim 9, further comprising at least one additional symmetrical driver connected to the bus and connected to the bias compensator.

11. The differential bus system as recited in claim 10, wherein the bus has a point-to-point configuration.

12. The differential bus system as recited in claim 10, wherein the bus has a bi-directional half-duplex configuration and a multi-drop configuration.

13. The differential bus system as recited in claim 9, wherein the offset is a DC offset.

14. The differential bus system as recited in claim 9, further comprising at least one asymmetrical driver connected to the bus.

15. The differential bus system as recited in claim 9, further comprising:
    at least one additional symmetrical driver connected to the bus; and
    at least one additional bias compensator integrated with the at least one additional symmetrical driver.

16. The differential bus system as recited in claim 9, wherein the termination bias is a voltage bias, and wherein the bias compensator is a voltage bias compensator.

17. The differential bus system as recited in claim 9, wherein the termination bias is previously unknown and wherein the bias compensator is capable of automatically supplying increasing signal until the termination bias is cancelled, and is capable of then automatically stopping the signal increase.

18. A method for significantly reducing an offset produced by a termination bias that is associated with a differential pair bus connected to a driver, the method comprising:

providing a first switch and a second switch for detecting whether the driver is driving the bus;

electrically connecting a signal source to one of the differential pair, for providing a current from a power line to the one of the differential pair when the switch detects whether the driver is driving the bus; and electrically connecting a signal sink to another of the differential pair, for providing a current from the another of the differential pair to ground when the switch detects whether the driver is driving the bus.

19. The method as recited in claim 18, further comprising:
    integrating the first switch, second switch, signal source, and signal sink to be a part of the driver.

20. The method as recited in claim 19, wherein providing the first switch and second switch includes providing a first transistor and a second transistor, respectively, that are each configured to be turned on when the driver is driving;
    wherein electrically connecting a signal source to one of the differential pair includes connecting a resistor between the power line and the first transistor; and
    wherein electrically connecting a signal sink to another of the differential pair includes connecting a resistor between the second transistor and ground.

21. A differential bus system for facilitating communication between computer devices, the differential bus system comprising:
    a bus including a termination bias that produces an offset;
    a symmetrical driver connected to the bus; and
    a bias compensator that is capable of significantly reducing the offset, the bias compensator including,
        a signal source connected to a first line of a differential pair of the bus;
        a signal sink connected to a second line of the differential pair;
        a first switch connected to the signal source and configured to turn the signal source ON when the symmetrical driver is driving; and
        a second switch connected to the signal sink and configured to turn the signal sink ON when the symmetrical driver is driving.

22. The differential bus system as recited in claim 21, wherein the first switch is a first tri-state detector, and the second switch is a second tri-state detector.

23. The differential bus system as recited in claim 21, wherein the first switch includes at least one transistor, and wherein the second switch includes at least one transistor.

24. The differential bus system as recited in claim 23, wherein the signal source includes a first resistor and is connected to a voltage power source, and wherein the signal sink includes a second resistor and is connected to ground.

25. The differential bus system as recited in claim 24, wherein the signal source further includes a first inductive component that is connected to the first resistor, and the signal sink further includes a second inductive component that is connected to the second resistor.

26. The differential bus system as recited in claim 21, wherein the signal source includes a first reactive source impedance, and wherein the signal sink includes a second reactive source impedance, each of which are capable of compensating for a capacitive load on the bus.

27. The differential bus system as recited in claim 21, wherein the signal source includes at least one transistor, and wherein the signal sink includes at least one transistor.

* * * * *